US006653941B2

United States Patent
Kim

(10) Patent No.: US 6,653,941 B2
(45) Date of Patent: Nov. 25, 2003

(54) DEVICE FOR SENSING AND ALARMING ABSENCE OF WATER IN A HOME MACHINE FOR MANUFACTURING SOYBEAN MILK, WATERY BEAN CURD, AND BEAN CURD

(76) Inventor: Hong-bae Kim, 5-7 Hyunchun-dong, Duckyang-ku, Koyang-shi, Kyunggi-do (KR)

( * ) Notice: Subject to any disclaimer, the term of this patent is extended or adjusted under 35 U.S.C. 154(b) by 0 days.

(21) Appl. No.: 10/131,460

(22) Filed: Apr. 25, 2002

(65) Prior Publication Data

US 2003/0141982 A1 Jul. 31, 2003

(30) Foreign Application Priority Data

Jan. 30, 2002 (KR) ......................................... 2002-2977

(51) Int. Cl.[7] .............................................. G08B 21/00
(52) U.S. Cl. .......................... 340/620; 340/618; 99/281
(58) Field of Search ................................. 340/520, 450, 340/450.3, 618, 620, 621, 622, 603, 604, 605, 619; 99/281, 285, 286, 337, 348

(56) References Cited

U.S. PATENT DOCUMENTS

| 4,203,099 | A | * | 5/1980 | Edwards | 340/618 |
| 4,205,237 | A | * | 5/1980 | Miller | 340/620 |
| 5,446,444 | A | * | 8/1995 | Lease | 340/618 |
| 5,600,997 | A | * | 2/1997 | Kemp et al. | 340/621 |
| 5,852,965 | A | * | 12/1998 | Kim | 99/281 |
| 6,232,883 | B1 | * | 5/2001 | Silva et al. | 340/604 |
| 6,247,393 | B1 | * | 6/2001 | Chang | 99/348 |
| 6,345,572 | B1 | * | 2/2002 | Kao | 99/337 |

* cited by examiner

Primary Examiner—Van Trieu
(74) Attorney, Agent, or Firm—Shlesinger, Arkwright & Garvey LLP

(57) ABSTRACT

A device is for sensing and alarming absence of water in a home machine for manufacturing soybean milk, watery bean curd, and bean curd, which allows the home manufacturing machine to be operated only when the home manufacturing machine contains water; so as to prevent the machine from being operated by a user without water, thereby preventing the machine from getting damaged. The apparatus includes a plurality of components installed in a body. The device includes a ground electrode and a signal electrode electrically connected to two selected in the plurality of the components, respectively; a resistor connected to the signal electrode; a switching transistor connected to the resistor; a controller connected to the switching transistor for outputting a control signal for an alarm when the absence of the water is sensed; a resistor connected to the controller; a switching transistor connected to the resistor; and a buzzer is connected to the switching transistor.

5 Claims, 6 Drawing Sheets

- PRIOR ART -

DEVICE FOR SENSING AND ALARMING ABSENCE OF WATER IN A HOME MACHINE FOR MANUFACTURING SOYBEAN MILK, WATERY BEAN CURD, AND BEAN CURD

BACKGROUND OF THE INVENTION

1. Field of the Invention

The present invention relates to a device for sensing and alarming absence of water in a home machine for manufacturing soybean milk, watery bean curd, and bean curd, and more particularly to a device for sensing and alarming absence of water in a home machine for manufacturing soybean milk, watery bean curd, and bean curd, which allows the home manufacturing machine to be operated only when the home manufacturing machine contains water, so as to prevent the machine from being operated by a user without water, thereby preventing the machine from getting damaged.

2. Description of the Prior Art

A conventional method for domestic use which manufactures soybean milks, watery bean curds, and bean curds will be described herein below.

First, the soybeans are washed clean. The washed beans are then soaked and made swollen in the water for several hours to be easily pulverized. The swollen beans are pulverized by using a millstone or a mixer, so that raw bean juice is produced. The raw bean juice is divided into bean-curd refuse and protein juice using a fine sieve gin or cloth. The divided protein juice is put in a kettle or a receptacle and boiled. At this time, since froth inevitably forms and causes the kettle or receptacle to overflow, the protein juice is boiled while repeatedly and artificially adjusting thermal power with care so that the froth does not overflow. After boiling the protein juice enough, an addition such as sugar or salt is put in the boiled protein juice to manufacture potable soybean milk. Also, after boiling the protein juice enough, a predetermined amount of coagulating agent such as calcium sulfate or the like is added to the boiled protein juice. After the coagulating agent-added protein juice is stirred, when several minutes elapse, it becomes a watery bean curd. The watery bean curd is put in a forming device and compressed and formed to manufacture bean curd.

However, in the conventional method for domestic use which manufactures soybean milks, watery bean curds, and bean curds, since several processes are separately performed, it is inconvenient. Since the manufacturing process is complicated and it takes a lot of time, the conventional method is inefficient. In particular, it takes a lot of time to make the beans swell. It is difficult to suitably adjust the amount of beans. The recovery rate of the protein juice is relatively low and it is difficult to manage a clean status.

In order to solve such problems, apparatuses capable of simply and conveniently manufacturing soybean milks, watery bean curds, and bean curds are proposed. Hereinafter, such conventional apparatus for domestic use which manufactures soybean milks, watery bean curds, and bean curds will be described with reference to FIG. 1.

Hereinafter, a conventional apparatus for domestic use which manufactures soybean milks, watery bean curds, and bean curds will be described with reference to FIG. 1.

FIG. 1 is a sectional view for showing a conventional apparatus for domestic use which manufactures soybean milks, watery bean curds, and bean curds. As shown in FIG. 1, the conventional apparatus includes a body 1, a driving motor 2, a short driving shaft 3, a long driving motor 4, a knife edge 5, a heater 6, and a temperature sensor 7. A cover is installed at a upper portion of the body 1. The body 1 is opened and closed by the cover. The driving motor 2 is installed at the cover of the body 1. When a power is applied to the driving motor 2, the driving motor 2 provides a rotating power. The short driving shaft 3 serves as a rotary shaft of the driving motor 2. The long driving motor 4 is detachably fitted to the shorter driving motor 3. The knife edge 5 is connected to an end portion of the long driving motor 4. The heater 6 heats contents included in the body 1. The temperature sensor 7 senses a heating temperature of the contents included in the body 1.

An operation of the conventional apparatus for domestic use which manufactures soybean milks, watery bean curds, and bean curds will now be explained.

When a user puts beans and water into the interior of the body 1 and inputs a power to a controller(not shown), the controller operates the driving motor 2. Then the driving motor 2 controls the knife edge 5 to pulverize the beans and water. The controller operates the heater 6 and the temperature sensor 7 to perform a series of processes, in which the beans and water are heated at a predetermined temperature, so that the soybean milks, watery bean curds, and bean curds are sequentially manufactured.

However, in the conventional apparatus for domestic use which manufactures soybean milks, watery bean curds, and bean curds, in order to manufacture the soybean milks, watery bean curds, and bean curds, water is absolutely necessary. If a user operates the conventional apparatus in a state in which a proper amount of water is not put into the interior of the body, the contents included in the body are spoilt and the conventional apparatus gets damaged.

SUMMARY OF THE INVENTION

Accordingly, the present invention has been made to solve the above-mentioned problems occurring in the prior art, and an object of the present invention is to provide a device for sensing and alarming absence of water in a home machine for manufacturing soybean milk, watery bean curd, and bean curd, which allows the home manufacturing machine to be operated only when the home manufacturing machine contains water, so as to prevent the machine from being operated by a user without water, thereby preventing the machine from getting damaged.

In order to accomplish this object, there is provided a device for sensing and alarming absence of water in an apparatus for manufacturing soybean milk, watery bean curd, and bean curd, the apparatus being in domestic use, the apparatus including a plurality of components installed in a body, the device comprising: a ground electrode and a signal electrode electrically connected to two selected in the plurality of the components, respectively; a first resistor connected to the signal electrode; a first switching transistor connected to the first resistor; a controller connected to the first switching transistor for outputting a control signal for an alarm when the absence of the water is sensed; a second resistor connected to the controller; a second switching transistor connected to the second resistor; and a buzzer connected to the second switching transistor.

In this case, the ground electrode and the signal electrode may be electrically connected to a heater and a short driving shaft, or to a heater and a filter net, or to a heater and an inner barrel, or to a first round bar and a second round bar, respectively.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
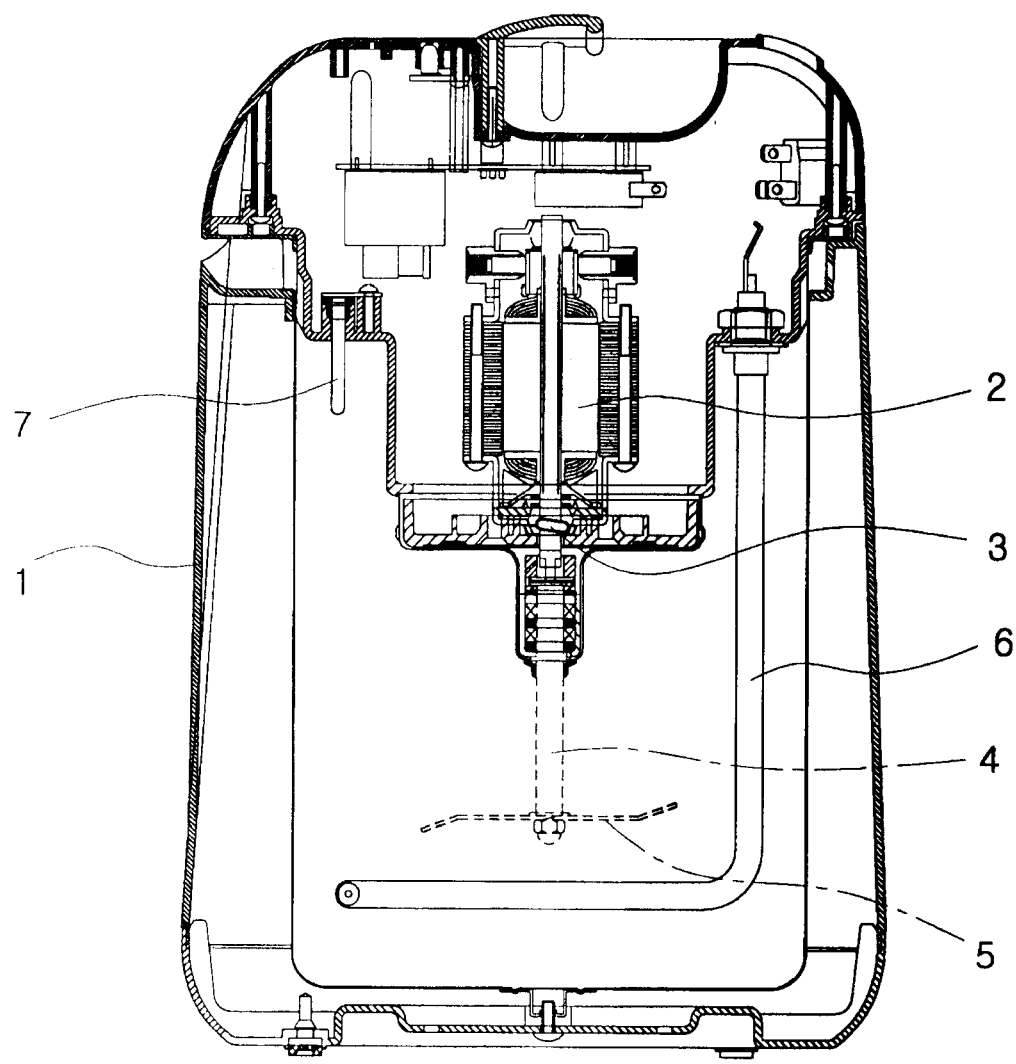
FIG. 1 is a sectional view for showing a conventional apparatus for domestic use which manufactures soybean milks, watery bean curds, and bean curds.

Hereinafter, a preferred embodiment of the present invention will be described with reference to the accompanying drawings. In the following description and drawings, the same reference numerals are used to designate the same or similar components, and so repetition of the description on the same or similar components will be omitted.

Figure 2:
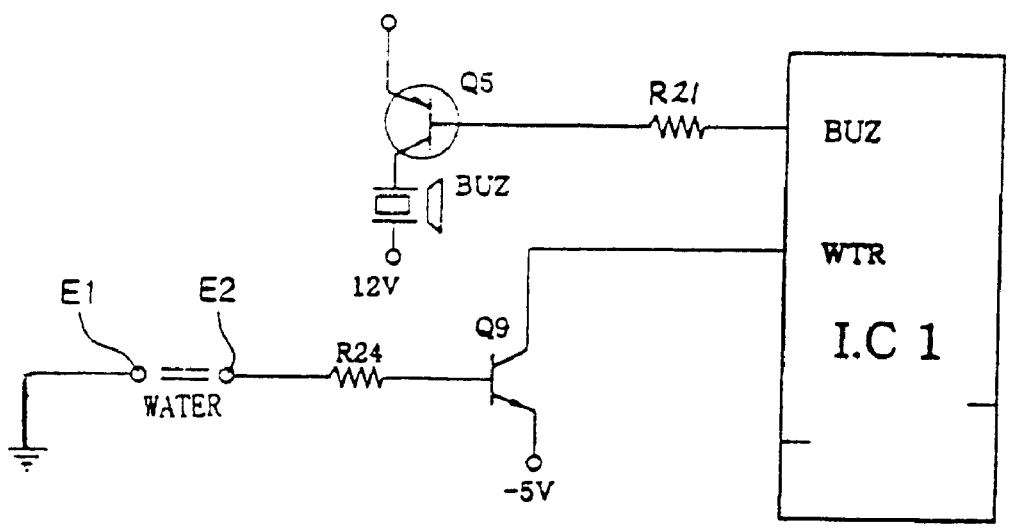
FIG. 2 is a circuitry diagram which shows a device for sensing and alarming absence of water in a home machine for manufacturing soybean milk, watery bean curd, and bean curd according to an embodiment of the present invention.

A device for sensing the absence of water in soybean milk, watery bean curd, and bean curd manufacturing apparatus for domestic use and generating an alarm signal indicative of the sensed result will be explained herein referring to FIG. 2 below. FIG. 2 is a circuitry diagram which shows the device for sensing and alarming absence of water in a home machine for manufacturing soybean milk, watery bean curd, and bean curd according to an embodiment of the present invention.

As shown in FIG. 2, the device includes a ground electrode E1, a signal electrode E2, a resistor R24, a switching transistor Q9, a controller I.C1, a resistor R21, a switching transistor Q5, and a buzzer BUZ. The ground electrode E1 and the signal electrode E2 are connected to two selected in components installed in a body 1, respectively. The resistor R24 is connected to the signal electrode E2. The switching transistor Q9 is connected to the resistor R24. The controller I.C1 is connected to the switching transistor Q9. The controller I.C1 outputs a control signal for alarm when the absence of water is sensed. The resistor R21 is connected to the controller I.C1. The switching transistor Q5 is connected to the resistor R21. The buzzer BUZ is connected to the switching transistor Q5.

Hereinafter, an operation of the device for sensing and alarming absence of water in a home machine for manufacturing soybean milk, watery bean curd, and bean curd according the present invention will be described.

When a user inputs power to a controller I.C1, the controller I.C1 judges whether or not water is present in the interior of the body 1 in response to a signal inputted from the signal electrode E2 through the resistor R24 and the switching transistor Q9. When the water is present in the interior of the body 1, the ground electrode E1 and the signal electrode E2 are electrically connected to each other by means of the water. Accordingly, a ground electric potential is applied to a base of the switching transistor Q9 to turn off the switching transistor Q9. When the water is absent in the interior of the body 1, the ground electrode E1 and the signal electrode E2 are electrically disconnected from each other. Accordingly, a non-ground electric potential is applied to the base of the switching transistor Q9 to turn on the switching transistor Q9.

The ground electrode E1 and the signal electrode E2 are used in connection to two selected components installed in the body, respectively.

FIGS. 3 through 6 show devices having the ground electrode E1 and the signal electrode E2 which are electrically connected to two selected components in the body 1, respectively, which sense the absence of water in soybean milk, watery bean curd, and bean curd manufacturing apparatus for domestic use and generate an alarm signal indicative of the sensed result according to embodiments of the present invention.

Figure 3:
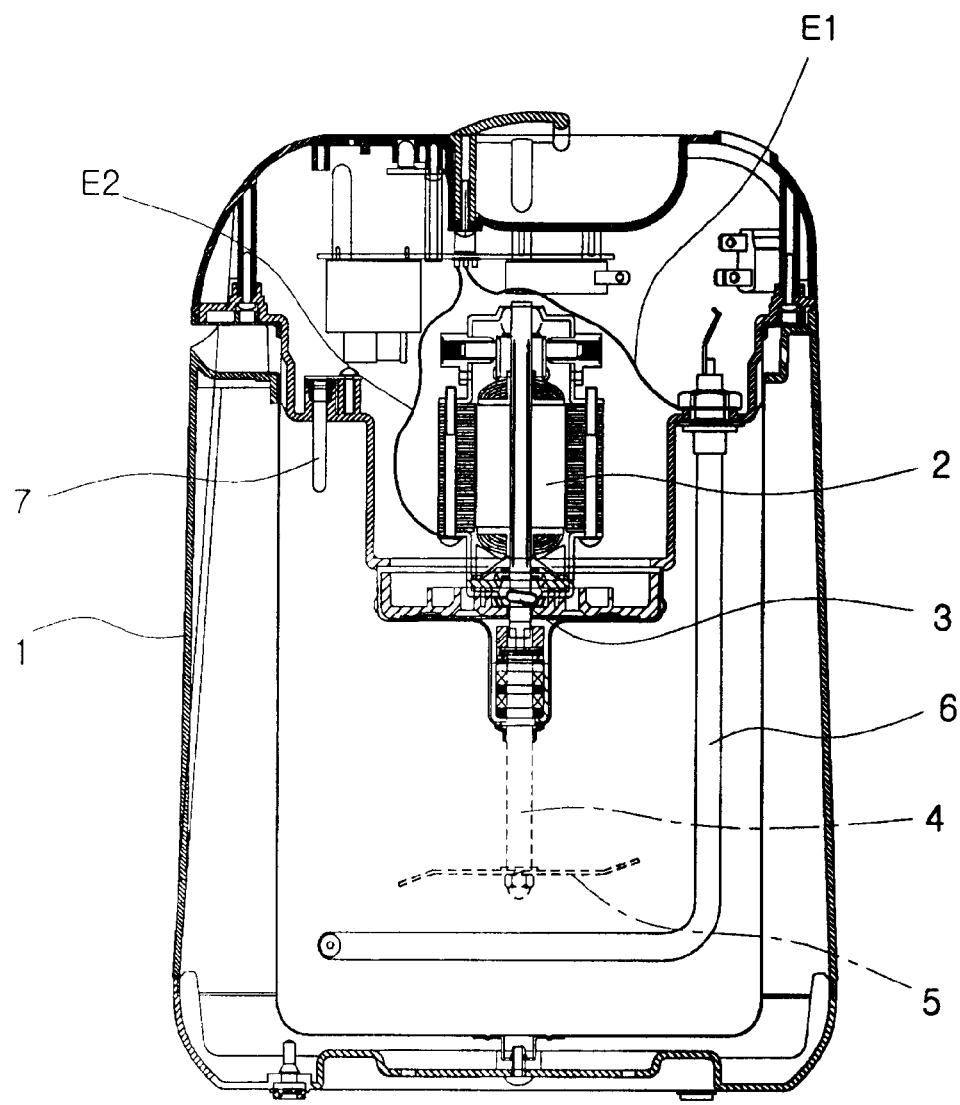
FIG. 3 is a sectional view for showing a device having two electrodes which are electrically connected to a heater and a short driving shaft, respectively, which senses the absence of water in soybean milk, watery bean curd, and bean curd manufacturing apparatus for domestic use and generates an alarm signal indicative of the sensed result according to a first embodiment of the present invention.

FIG. 3 shows the ground electrode E1 and the signal electrode E2 which are electrically connected to a heater 6 and a shorter driving shaft 3, respectively, according to the first embodiment of the present invention.

Figure 4:
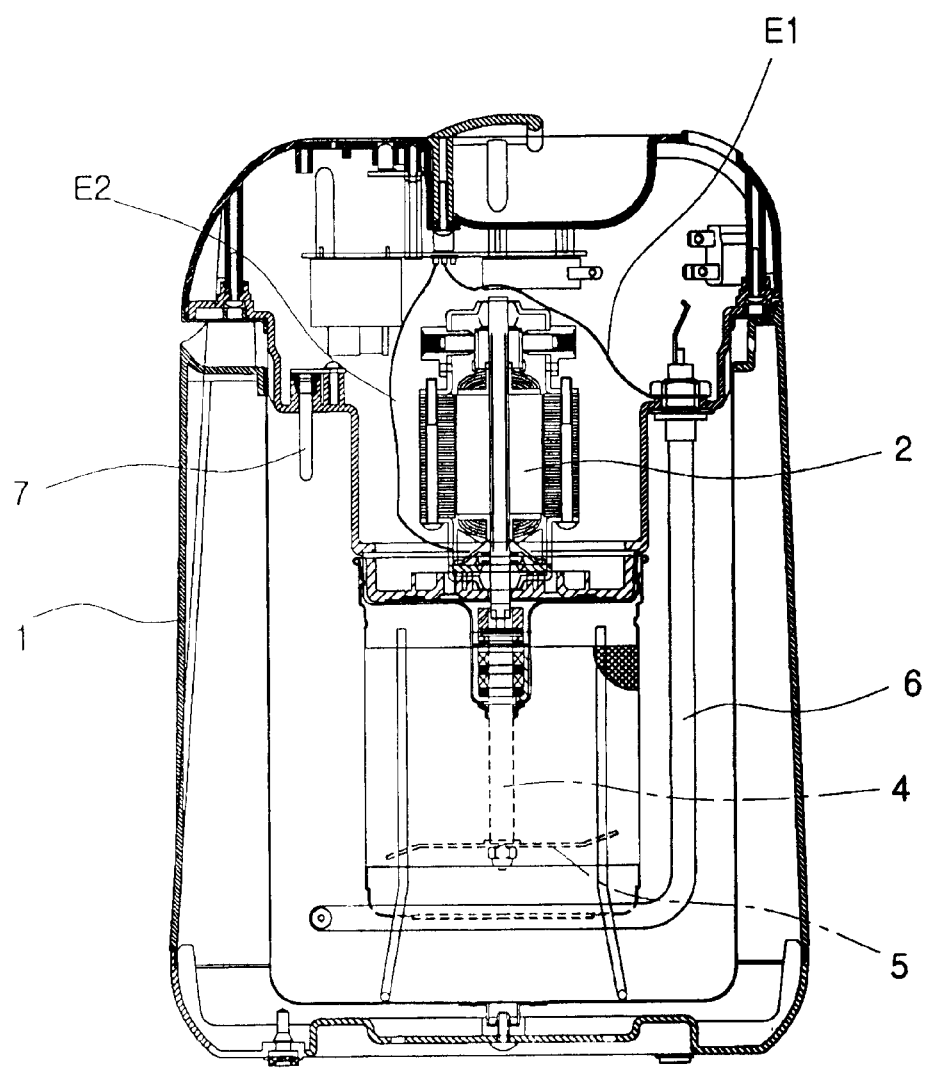
FIG. 4 is a sectional view for showing a device having two electrodes which are electrically connected to a heater and a filter net, respectively, which senses the absence of water in soybean milk, watery bean curd, and bean curd manufacturing apparatus for domestic use and generates an alarm signal indicative of the sensed result according to a second embodiment of the present invention.

FIG. 4 shows the ground electrode E1 and the signal electrode E2 electrically connected to a heater 6 and a filter net, respectively, according to the second embodiment of the present invention.

Figure 5:
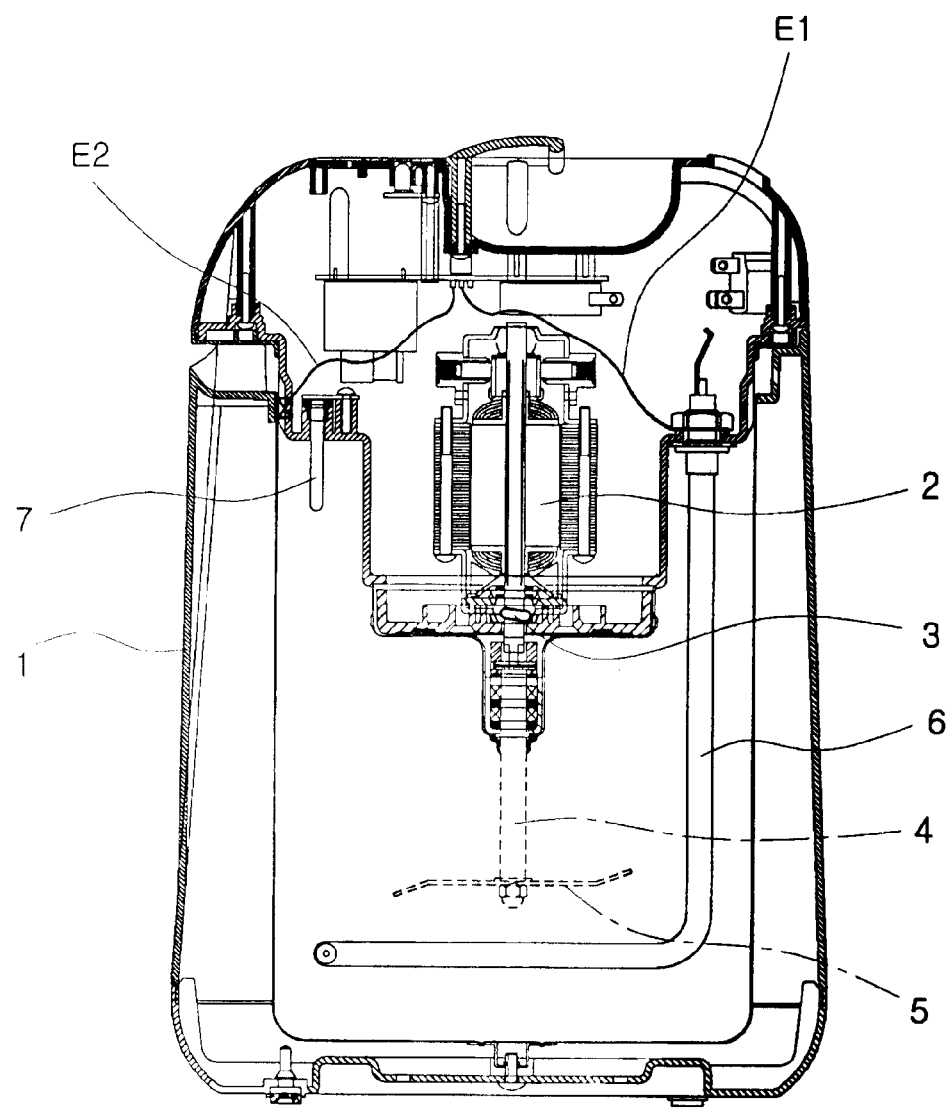
FIG. 5 is a sectional view for showing a device having two electrodes which are electrically connected to a heater and an inner barrel, respectively, which senses the absence of water in soybean milk, watery bean curd, and bean curd manufacturing apparatus for domestic use and generates an alarm signal indicative of the sensed result according to a third embodiment of the present invention.

FIG. 5 shows the ground electrode E1 and the signal electrode E2 which are electrically connected to a heater 6 and an inner barrel, respectively, according to the third embodiment of the present invention.

Figure 6:
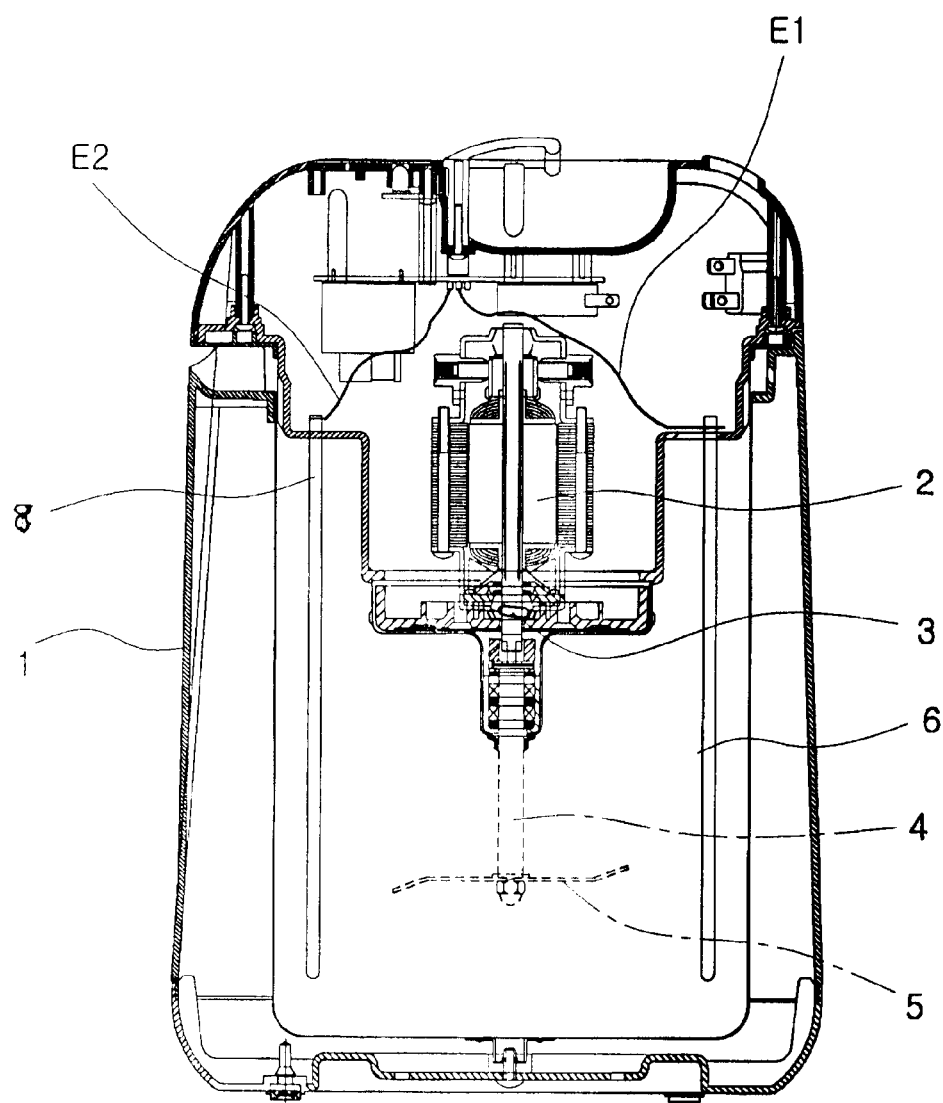
FIG. 6 is a sectional view for showing a device having two electrodes which are electrically connected to a first round bar and a second round bar, respectively, which senses the absence of water in soybean milk, watery bean curd, and bean curd manufacturing apparatus for domestic use and generates an alarm signal indicative of the sensed result according to a fourth embodiment of the present invention.

FIG. 6 shows the ground electrode E1 and the signal electrode E2 which are electrically connected to a round bar 8 and a round bar, respectively, according to the fourth embodiment of the present invention.

When the water is absent between the ground electrode E1 and the signal electrode E2, the switching transistor Q9 is turned on. Accordingly, the controller I.C1 drives the switching transistor Q9 connected to an output terminal of the controller I.C1. The switching transistor Q9 drives and operates the buzzer BUZ to output an alarm sound.

When a user puts beans and water in the interior of the body 1, the controller I.C1 operates a driving motor 2. Then the driving motor 2 controls the knife edge 5 to pulverize the beans and water. The controller I.C1 operates the heater 6 and the temperature sensor 7 to perform a series of processes so that soybean milk, watery bean, and bean curd are sequentially manufactured. The series of processes are processes which heat the beans and water As mentioned above, the present invention can provides an apparatus for sensing and alarming whether water is present in a machine for manufacturing soybean milk, a watery bean curd, and a bean curd, which allows the home manufacturing machine to be operated only when the home manufacturing machine contains water, so as to prevent the machine from being operated by a user without water, thereby preventing the machine from getting damaged. The present invention can be applied and used in an apparatus field which manufactures soybean milks, watery bean curds, and bean curds, without departing from the scope and spirit of the invention.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A device for sensing and alarming absence of water in an apparatus for manufacturing soybean milk, watery bean curd, and bean curd, the apparatus being in domestic use, the apparatus including a plurality of components installed in a body, the device comprising:

a ground electrode and a signal electrode electrically connected to two selected in the plurality of the components, respectively;

a first resistor connected to the signal electrode;

a first switching transistor connected to the first resistor;

a controller connected to the first switching transistor for outputting a control signal for an alarm when the absence of the water is sensed;

a second resistor connected to the controller;

a second switching transistor connected to the second resistor; and a buzzer connected to the second switching transistor.

2. The device as claimed in claim 1, wherein the ground electrode and the signal electrode are electrically connected to a heater and a short driving shaft, respectively.

3. The device as claimed in claim 1, wherein the ground electrode and the signal electrode are electrically connected to a heater and a filter net, respectively.

4. The device as claimed in claim 1, wherein the ground electrode and the signal electrode are electrically connected to a heater and an inner barrel, respectively.

5. The device as claimed in claim 1, wherein the ground electrode and the signal electrode are electrically connected to a first round bar and a second round bar, respectively.

* * * * *